July 21, 1925.
Re. 16,118
E. H. COSBY
GOLF CLUB STAFF
Original Filed Nov. 2, 1923
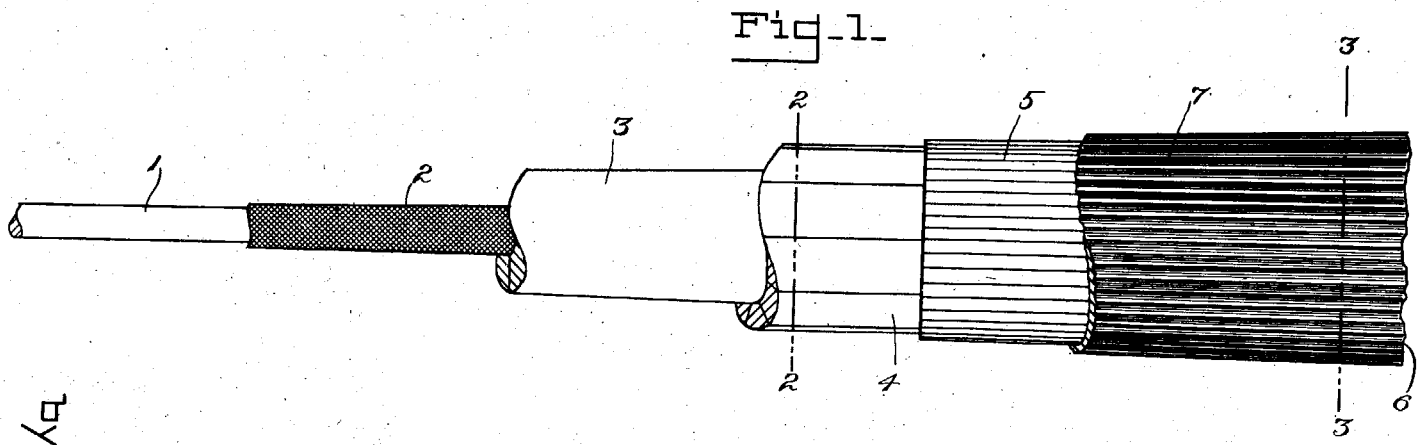
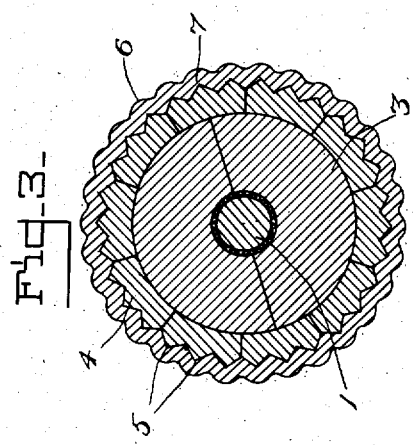
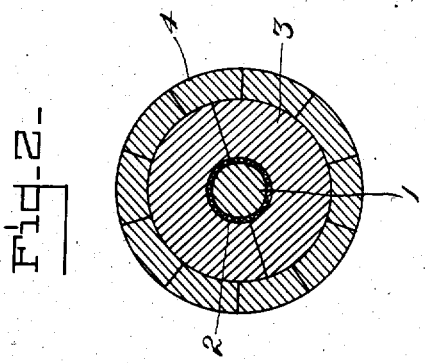
INVENTOR:
Edwin H. Cosby
by Macleod, Calver, Copeland & Dike
ATTORNEYS.

Reissued July 21, 1925.

Re. 16,118

UNITED STATES PATENT OFFICE.

EDWIN H. COSBY, OF DERBY LINE, VERMONT.

GOLF-CLUB STAFF.

Original No. 1,510,564, dated October 7, 1924, Serial No. 672,371, filed November 2, 1923. Application for reissue filed June 2, 1925. Serial No. 34,498.

*To all whom it may concern:*

Be it known that I, EDWIN H. COSBY, a citizen of the United States, residing at Derby Line, in the county of Orleans and State of Vermont, have invented a new and useful Golf-Club Staff, of which the following is a specification.

This invention aims to provide a staff for a golf club, so constructed that it will possess strength, the staff of the club being provided with a novel grip, which will enhance the hold of the player on the staff of the club.

It is within the province of the disclosure to improve generally and to enhance the utility of devices of that type to which the invention appertains.

With the above and other objects in view, which will appear as the description proceeds, the invention resides in the combination and arrangements of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1 shows in side elevation, a golf club staff constructed in accordance with the invention, parts being successively broken away; Figure 2 is a cross section on the line 2—2 of Figure 1; Figure 3 is a cross section on the line 3—3 of Figure 1.

The golf club staff forming the subject matter of this application includes a core 1 which, preferably, is made of steel, or of some other metal, the core 1 being surrounded by a textile covering 2, which may be in the form of a tube of braided material. About the covering 2 is disposed a casing 3, preferably made of hard wood, the casing being divided into two or more sections. A body 4, made of bamboo, rattan or other like material, is disposed about the casing 3, and is divided radially into a plurality of sections, there being, preferably, more sections in the body 4 than there are in the casing 3. Adjacent to the handle end of the staff, the body 4 is supplied with longitudinal ribs 5. About the ribbed portion 5 of the body 4 is disposed a tubular grip 6 made of leather, rubber, or other suitable material, the grip being pressed inwardly between the ribs 5 of the body 4 to form external ribs 7 in the grip 6. The constituent parts of the device, constructed as above described, preferably are secured together by glue or cement, and the result is a golf club staff of great strength, a grip being provided which may be grasped readily in the hand of the player to prevent the club from slipping and it being practically impossible for the grip to become detached from the staff of the club.

What I claim is:

1. In a golf club staff, comprising a metal core and a wooden enclosure for the core, the enclosure comprising an inner casing and an outer body, the casing and the body being divided longitudinally and the joints in the casing being disposed in break-joint order with respect to the joints of the body, circumferentially of the staff.

2. A golf club staff comprising a metal core and a wooden enclosure for the core, the enclosure comprising an inner casing and an outer body, the casing and the body being divided longitudinally, the joints of the casing being disposed in break-joint relation to the joints of the body, and a textile covering interposed between the casing and the core.

3. A golf club staff comprising a metal core and a wooden enclosure for the core, the wooden enclosure being provided with longitudinal ribs, and a tubular grip extending about the ribs and cooperating with the ribs to form external ribs in the grip.

4. A golf club staff including a handle portion provided with longitudinal ribs and a tubular grip extending about the ribs and cooperating with the ribs to form external ribs on the grip.

In testimony whereof I affix my signature.

EDWIN H. COSBY.